United States Patent
Strinnholm

(10) Patent No.: US 6,433,718 B2
(45) Date of Patent: Aug. 13, 2002

(54) D/A CONVERSION METHOD AND APPARATUS

(75) Inventor: Daniel Strinnholm, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/772,686

(22) Filed: Jan. 30, 2001

(30) Foreign Application Priority Data

Jan. 31, 2000 (SE) .......................................... 0000284-0

(51) Int. Cl.[7] ................................................ H03M 1/66
(52) U.S. Cl. ........................ 341/144; 341/138; 341/139
(58) Field of Search ................................. 341/138, 139, 341/144

(56) References Cited

U.S. PATENT DOCUMENTS 4,818,996 A * 4/1989 Kimura ........................ 341/144
5,138,317 A * 8/1992 Story ............................ 341/144
5,757,592 A * 5/1998 Flowers et al. .............. 375/243
5,977,896 A * 11/1999 Kohdaka et al. ............ 341/143

FOREIGN PATENT DOCUMENTS

JP          05059804          3/1994

* cited by examiner

*Primary Examiner*—Michael Tokar
*Assistant Examiner*—Khai M. Nguyen
(74) *Attorney, Agent, or Firm*—Burns, Doane, Swecker & Mathis, L.L.P.

(57) ABSTRACT

A D/A conversion system includes means for arranging a stream of digital samples into frames, each frame including a guard time period. Means are provided for determining a measure of the overall magnitude of digital samples in each frame. Means increase the magnitude of all samples of frames that have a measure that falls below a predetermined threshold by shifting the samples a common number of bits. A D/A converter converts frames with shifted and frames with unshifted samples. An attenuator attenuates the D/A converted samples of frames with shifted samples to compensate for the magnitude increase.

11 Claims, 9 Drawing Sheets

D/A CONVERSION METHOD AND APPARATUS

BACKGROUND

The present invention relates to a D/A conversion method and apparatus suitable for DMT (Discrete Multi Tone) systems, for example ADSL (Asymmetric Digital Subscriber Line) systems and VDSL (Very high frequency Digital Subscriber Line) systems, or OFDM (Orthogonal Frequency Division Multiplex) systems.

A well known problem in D/A conversion is that often the digital samples that are to be D/A converted have a higher resolution (more bits) than the D/A converter used for the conversion.

One solution to this problem is to simply ignore the least significant bits of the digital samples and only use the bits that fit into the D/A converter. Thus, the samples are truncated before actual D/A conversion. This method, however, has the drawback that it raises the noise level of the resulting analog signal, since this truncation corresponds to a further quantization of the digital signal.

Another solution, described in U.S. Pat. No. 4,818,996, with reference to audio processing systems, tests whether samples have the most significant bits set to 0. If so, the samples are shifted before D/A conversion. In this way the least significant bits will be shifted into the conversion range of the D/A converter. After D/A conversion the resulting analog signal is attenuated to a corresponding degree to restore the correct signal level. However; as noted in U.S. Pat. No. 4,818,996, if this method is used on a sample for sample basis, it will introduce distortion due to the transients that are produced during switching of the attenuator between attenuating and non-attenuating states. In U.S. Pat. No. 4,818,996 this problem is somewhat reduced by requiring that a weak signal must exist for a certain period of time (predetermined number of samples) before subsequent samples are shifted and attenuated. This avoids too frequent switching back and forth between the two D/A conversion modes. However, the remaining mode switches will still produce distortion when they occur. This distortion will increase with the D/A conversion rate, since the mode switches will become more frequent at higher D/A conversion rates. Since the D/A conversion rate for DMT (for example ADSL or xDSL) systems is at least an order of magnitude higher than for audio signal processing, this method is not suitable in such applications.

SUMMARY

An object of the present invention is to provide a D/A conversion method and apparatus suitable for DMT systems, such as xDSL systems, for example ADSL and VDSL systems, or OFDM systems that use the bit shift/attenuation or similar technique but avoid or reduce the distortion due to transients during mode switching to a minimum.

This object is achieved in accordance with the attached claims.

Briefly, an exemplary embodiment of the present invention uses the guard time period (cyclic prefix) between symbols to perform mode switches. If the sample having the largest magnitude of a frame needs to be shifted, the entire frame is shifted. Thus, mode switches will only be performed at frame boundaries. This restricts the transients to the guard time period, where they will not distort the useful signal.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
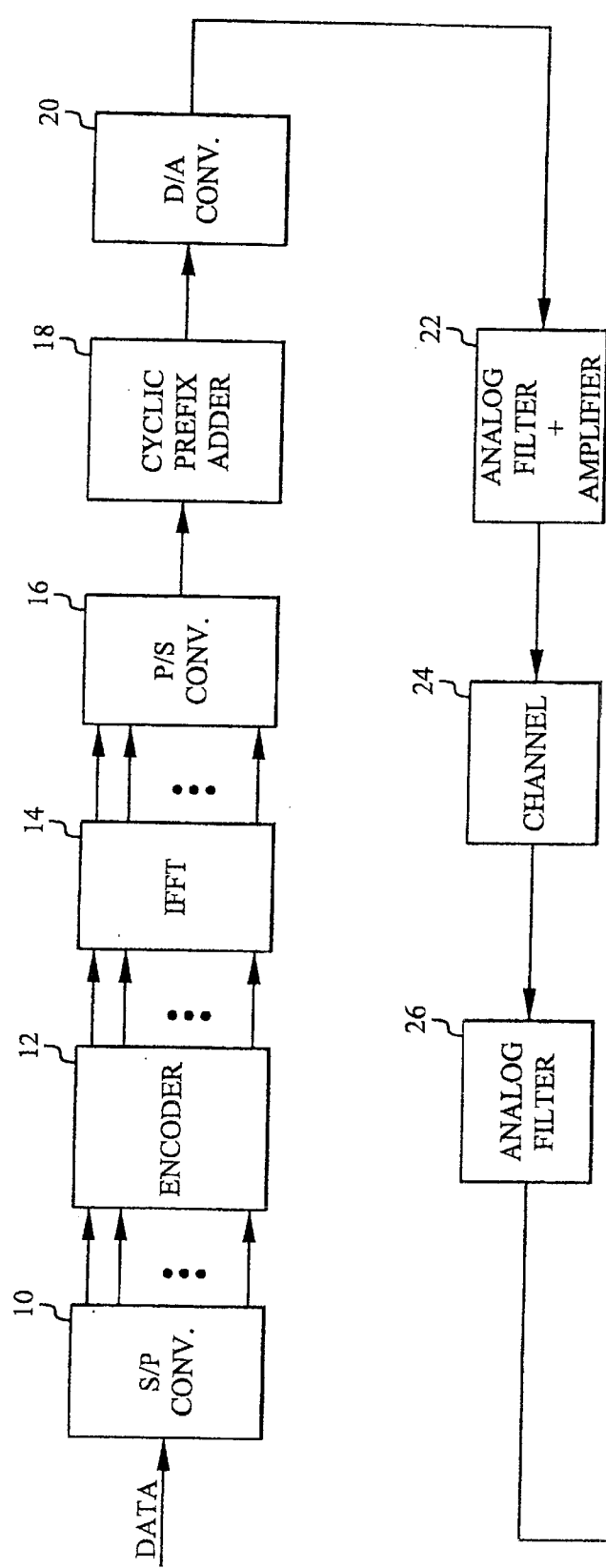
FIG. 1 is a block diagram of a typical DMT system, for example an ADSL system.
Figure 1:
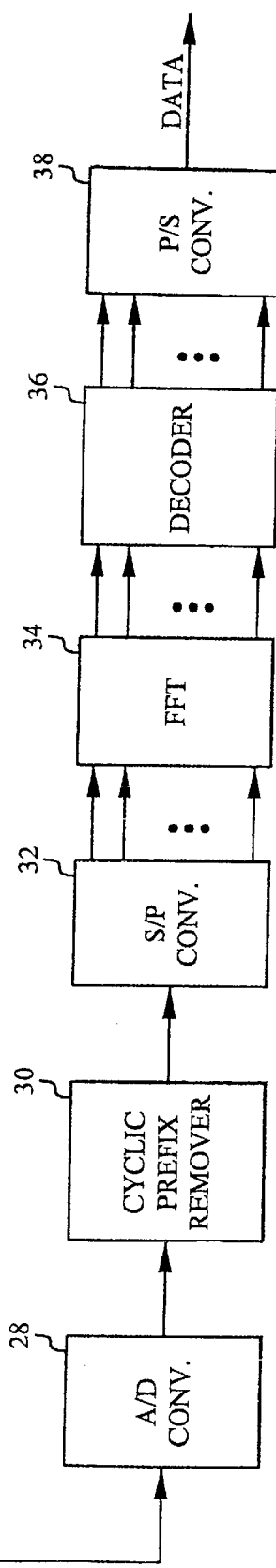

FIG. 1 is a block diagram of a typical DMT system, for example an ADSL system. A serial data stream is divided into frames or symbols that are forwarded to a serial/parallel converter 10. The resulting parallel data frame is forwarded to an encoder 12, which encodes the frame bits into a set of complex vectors. These complex vectors are interpreted as a Fourier transform and are forwarded to an inverse Fourier transform block 14. The result is an array of real valued samples. These samples are forwarded to a parallel/serial converter 16 to produce an array of serial samples. A cyclic prefix adder 18 adds a copy of a predetermined number of the last samples to the beginning of the array. The result is a stream of serial real valued data frames, each provided with a cyclic prefix. These frames are forwarded to a D/A converter 20. The resulting analog signal is filtered and amplified in block 22, transferred over a channel 24, filtered in an analog filter 26 at the receiving end, and thereafter digitized in an A/D converter 28. The cyclic prefix is removed in block 30. The remaining serial samples are converted in a serial/parallel converter 32 and processed in a Fourier transform block 34. The resulting complex Fourier coefficients are forwarded to a decoder 36, which retrieves the original symbol (frame). Finally, this symbol is converted to serial form in block 38.

The present invention is primarily concerned with the D/A conversion and its consequences. As noted above, the samples forwarded to D/A converter 20 often have a higher resolution (more bits) than the D/A converter can process. The conventional solution to this problem is to simply ignore the least significant bits of the digital samples and only use the bits that fit into the D/A converter. Thus, the samples are truncated before actual D/A conversion. This method, however, has the drawback that it raises the noise level of the resulting analog signal, since this truncation corresponds to a further quantization of the digital signal. This will be explained with reference to a hypothetical D/A converter having a magnitude resolution of only 2 bits. The samples of the digital input signal are assumed to have a magnitude resolution of 3 bits (the samples are assumed to be represented by 1 sign bit and 3 magnitude bits). Although both resolutions are much smaller than in practice (typical resolutions are 12 bits for the D/A converter and 14 bits for the samples), it is easier to illustrate the consequences of truncation at such low resolutions.

Figure 2:
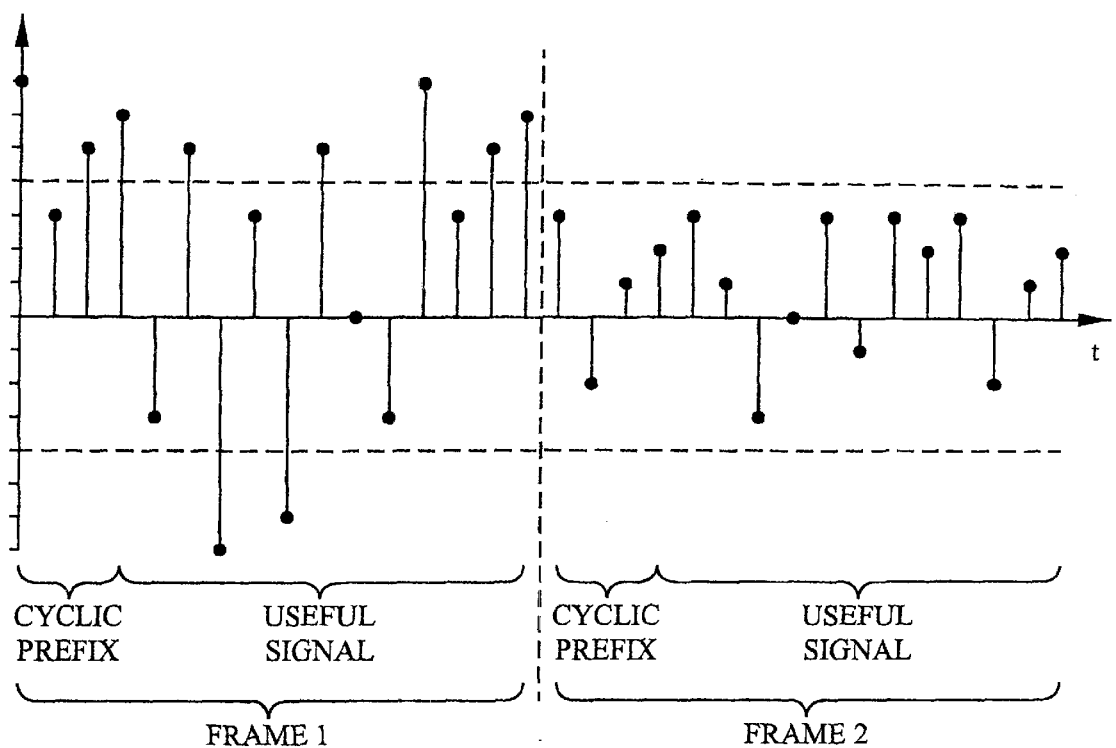
FIG. 2 is a time diagram illustrating a digital signal.

FIG. 2 is a time diagram illustrating the original digital signal before truncation. The figure illustrates samples of two frames, each frame containing 16 samples. It is noted that the cyclic prefix is included in each frame and repeats the last 4 samples of the useful signal at the beginning of the frame. It is noted that the sample magnitude has 8 possible values (3 bits). In practice a frame contains more samples, for example 512 samples at a sampling frequency of 2.208 MHz plus a cyclic prefix of 32 samples. The resolution is also higher, for example 13–14 bits.

Figure 3:
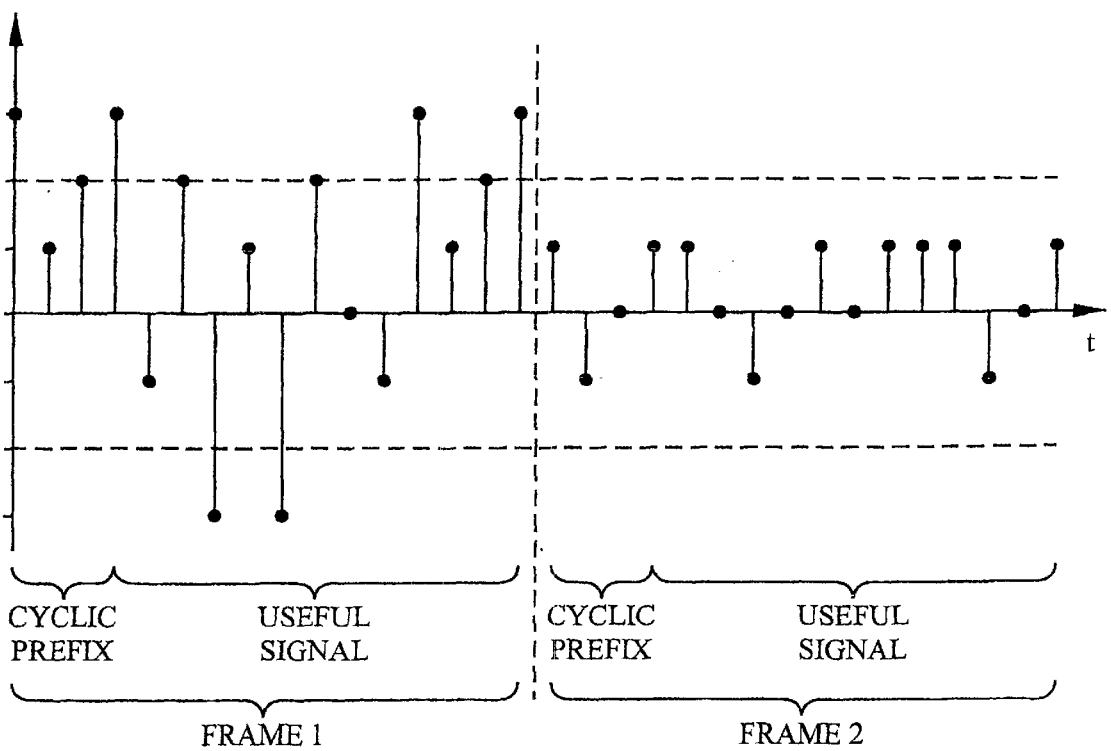
FIG. 3 is a time diagram illustrating the truncation of the digital signal in FIG. 1 caused by a conventional D/A converter.

FIG. 3 is a time diagram illustrating the truncation of the digital signal in FIG. 1 caused by a conventional D/A converter. In this case it is assumed that the D/A converter only has 4 magnitude levels (2 bits). From FIG. 3 it is apparent that the result of ignoring (truncating) the least significant bit is a distortion of the signal. This distortion is especially visible in frame 2, where all signal samples are small.

The principles of the present invention will now be described with reference to FIGS. 4–6.

The simplest embodiment of the present invention is essentially based on 3 steps:
1. Determine the maximum sample magnitude of a frame.
2. If this maximum magnitude is such that the most significant bit is 0, all the samples of the frame are shifted one bit to double their magnitude.
3. If the samples of a frame have been shifted, the part of the analog signal that corresponds to the frame is attenuated by 50%.

Figure 4:
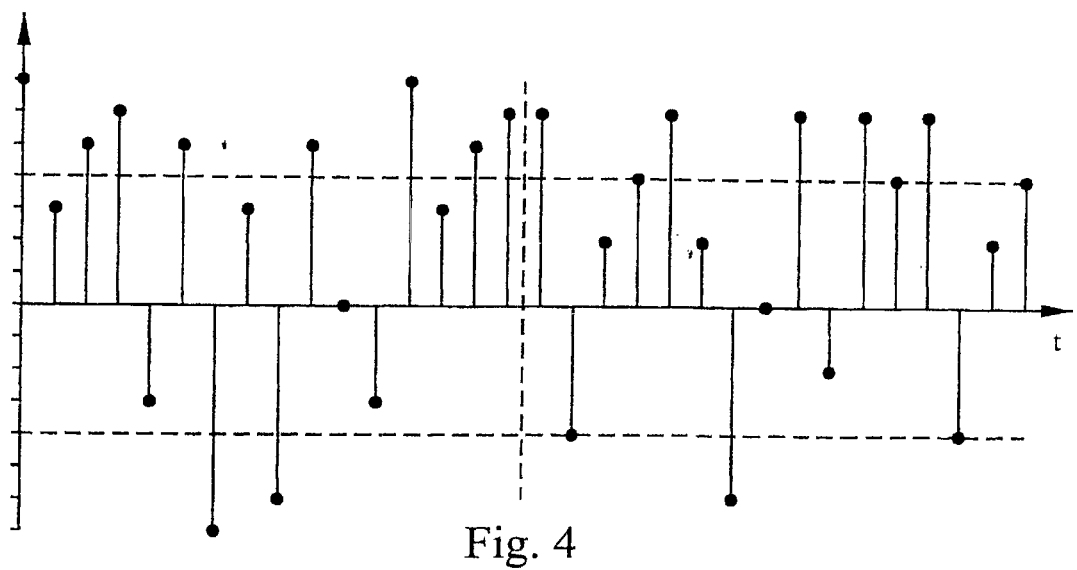
FIG. 4 is a time diagram of the digital signal in FIG. 1 after a first modification step in accordance with the present invention.

FIG. 4 is a time diagram of the digital signal in FIG. 1 after performing steps 1 and 2. It is noted that frame 1 is unaffected, since its maximum magnitude has the most significant bit set to 1. Frame 2 of the original signal in FIG. 2 has all samples below the dashed lines representing the border between levels that have the most significant bit set to 1 and levels that have the most significant bit set to 0. Therefore all the samples of this frame are shifted, as illustrated by the right frame in FIG. 4.

Figure 5:
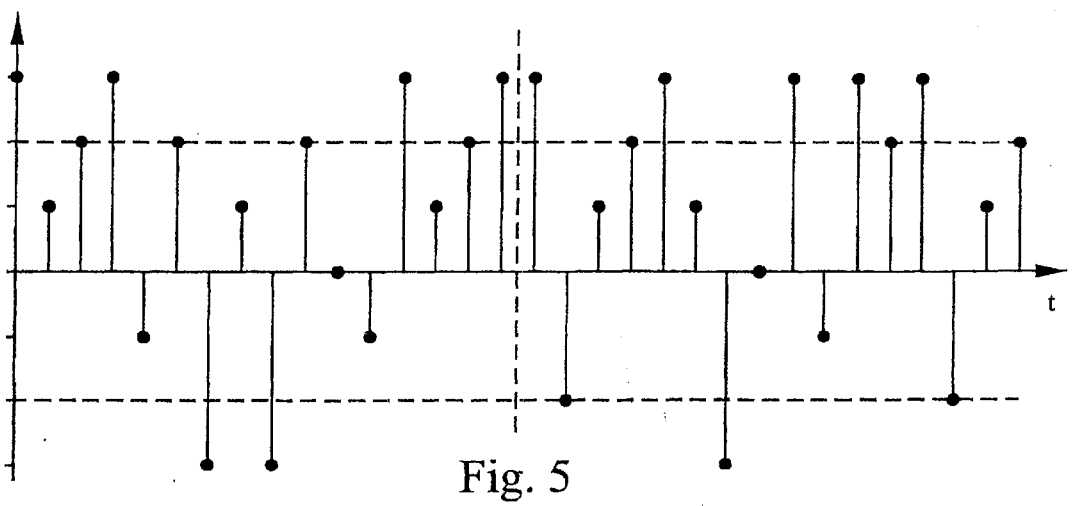
FIG. 5 is a time diagram of the signal of FIG. 4 after truncation.

FIG. 5 is a time diagram of the signal of FIG. 4 after truncation. It is noted that the unshifted left frame is identical to frame 1 in FIG. 3, which is to be expected, since it has been processed in the same way. It is also noted that the second, right frame, the samples of which have been shifted, is unaffected by the truncation. This may be understood by noticing that the shift operation sets the least significant bit to 0 in all samples. Ignoring this bit will not alter the samples. The signal of FIG. 5 is then D/A converted, and the magnitudes of the part of the signal that corresponds to the second frame is restored by attenuation in the analog domain.

Figure 6:
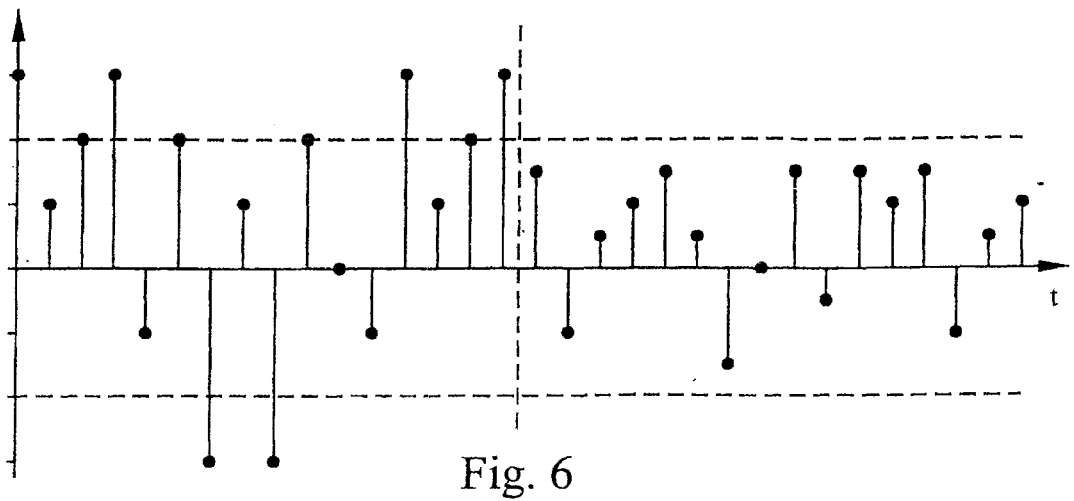
FIG. 6 is a time diagram of an "effective" digital signal corresponding to the signal in FIG. 1.

Another way of looking at the present invention is illustrated by FIG. 6. FIG. 6 is a time diagram of an "effective" digital signal corresponding to the signal in FIG. 2. This is a signal in which the first frame has truncated samples, while the second frame has unaltered samples. If this signal is D/A converted in a D/A converter with full magnitude resolution (3 bits), one obtains the same result as if the original signal in FIG. 2 is D/A converted in accordance with the present invention in a D/A converter with only 2 bits magnitude resolution. Apparently weak signal frames are processed more accurately than in the conventional converter (compare FIGS. 3 and 6 to FIG. 2).

An essential feature of the present invention is that bit shifting/attenuation is only performed on entire frames. This allows the distorting transients that are produced by the mode switching to occur during the cyclic prefix, which is later removed anyway. However, although a cyclic prefix is preferred, it is not absolutely necessary for the present invention. The essential feature is a guard time period that accommodates the transients. Such a guard time period may, for example, also be filled with zeroes.

In the above description it has been assumed that only 1 bit is truncated by the D/A converter. However, it is appreciated that several bits may be truncated by the D/A converter. In such a case it is possible to have different shifts and attenuations, depending on how many of the most significant bits are set to 0 in the samples of a frame. For example, if the 2 most significant bits of the magnitude of all samples of a frame are both 0, the samples will be shifted by 2 bits and the analog signal will be reduced to ¼. However, shifting/attenuation is still performed on a frame by frame basis.

Figure 7:
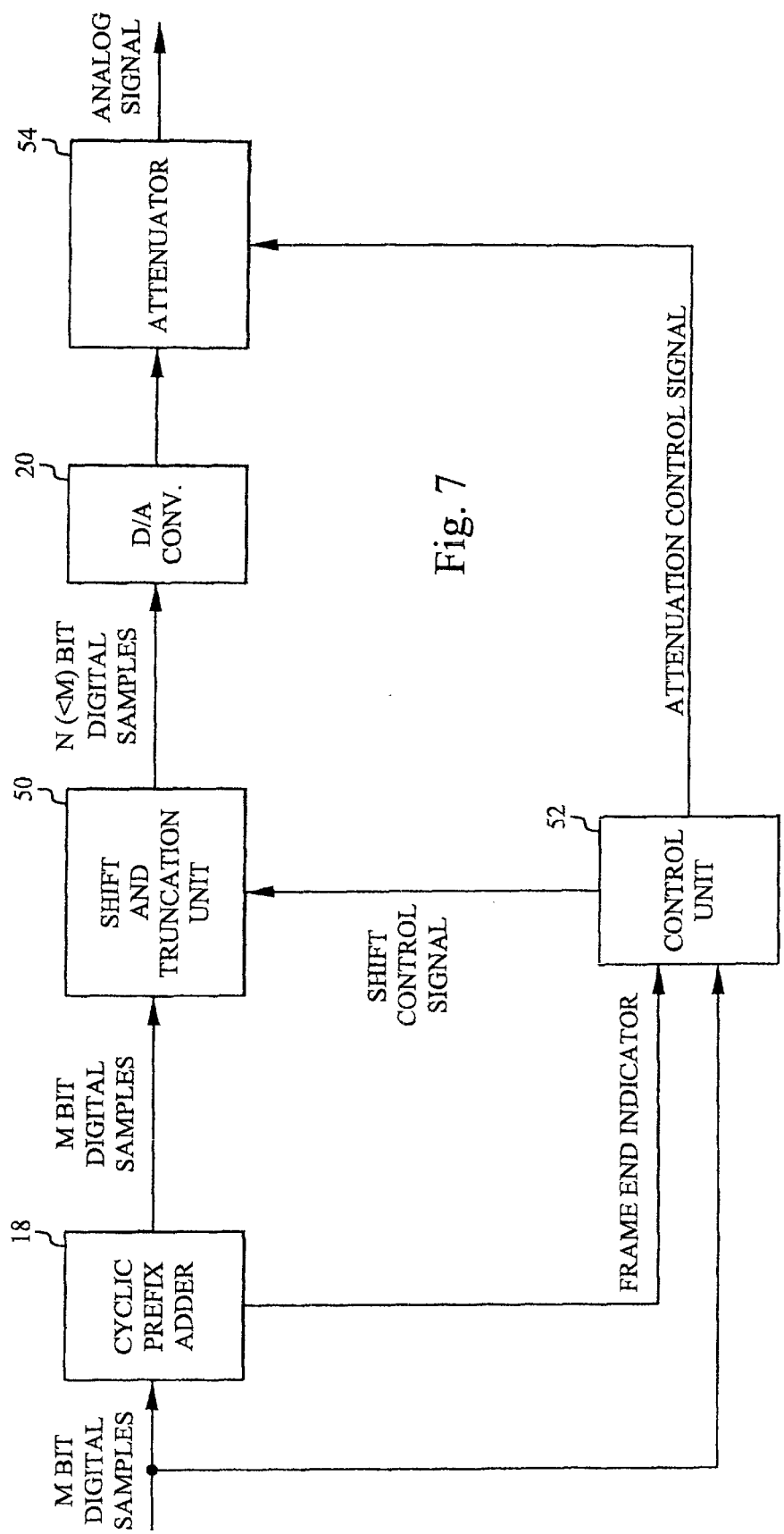
FIG. 7 is a block diagram of an exemplary embodiment of the D/A converter in accordance with the present invention.

FIG. 7 is a block diagram of an exemplary embodiment of the D/A converter in accordance with the present invention. The samples from cyclic prefix adder 18 are forwarded to a shift and truncation unit 50. This unit may, for example comprise a shift register. A control unit 52 also receives the useful samples and determines the maximum magnitude sample of each frame. Depending on the values of the most significant bits of this maximum magnitude sample, control unit 52 instructs shift and truncation unit 50 to either shift or not shift for the duration of the frame. As noted above a shift may be over several bit positions. The duration of a frame may be indicated by a frame end indicator from cyclic prefix adder 18. Another possibility is to count the number of samples in control unit 52 and to reset a counter when a full frame has been received (all frames are assumed to be of equal length). The possibly shifted and truncated signal samples are then forwarded to D/A converter 20. After D/A conversion an attenuator 54, which is controlled by control unit 52, attenuates the analog signal sections that correspond to bit shifted frames. If the system includes an amplifier, as indicated in FIG. 1, a suitable embodiment is to integrate the attenuator in the amplifier and to control the amplification instead.

The functionality of control unit 52 may, for example, be provided by a microprocessor.

Other measures than the maximum magnitude sample of a frame are also possible. For example, it is possible to decide to perform shifting/attenuation of a frame if a certain percentage, such as 90%, of the samples of a frame have a magnitude less than a certain threshold. Another possible measure is the frame energy. Although these alternative measures may result in clipping of a few strong samples, the overall performance may still be improved.

Figure 8:
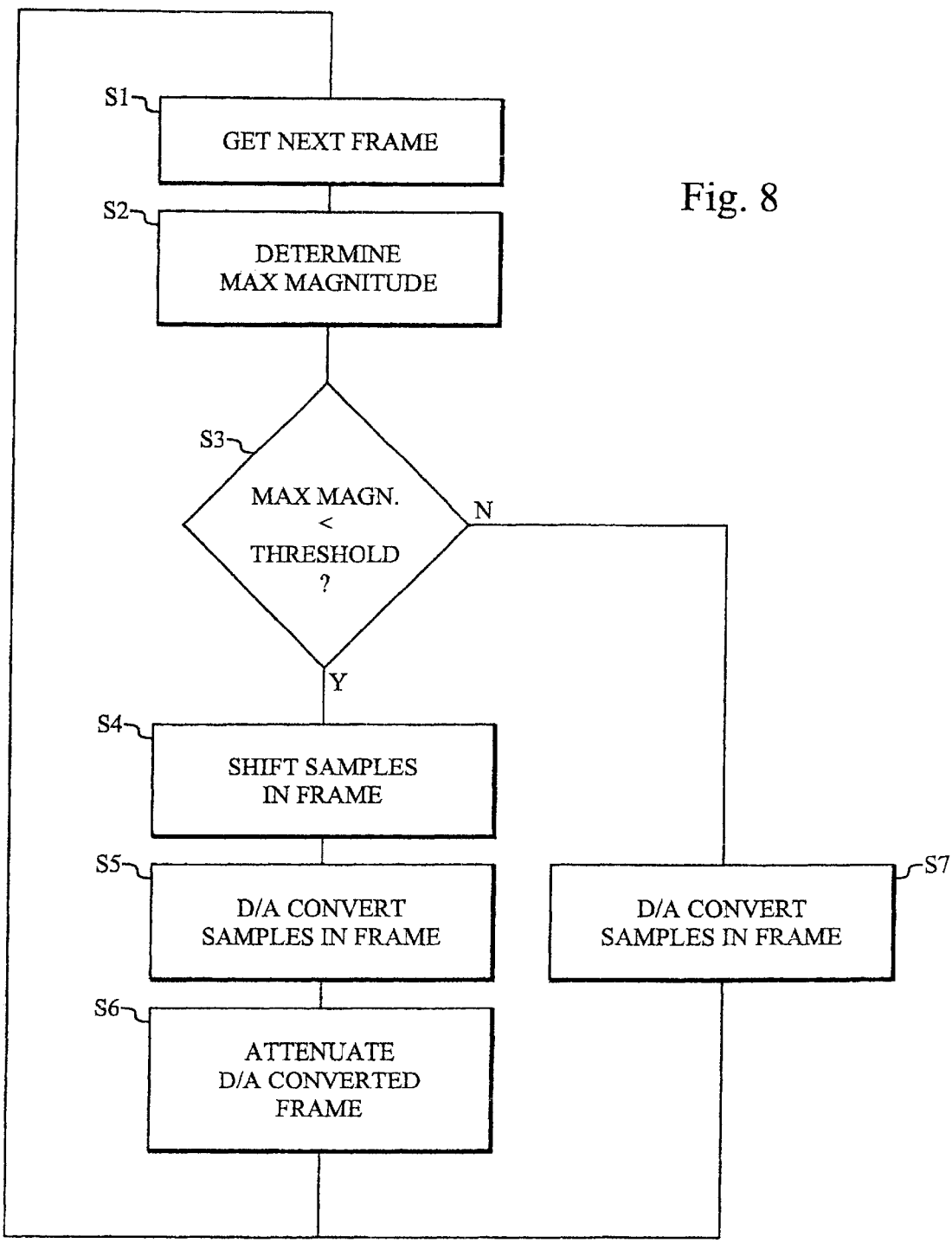
FIG. 8 is a flow chart of an exemplary embodiment of the D/A conversion method in accordance with the present invention.

FIG. 8 is a flow chart of an exemplary embodiment of the D/A conversion method in accordance with the present invention. This embodiment may be implemented by the D/A converter in FIG. 7. Step S1 gets the next frame. Step S2 determines the maximum sample magnitude of the frame. Step S3 test whether this maximum magnitude is less than a predetermined threshold. If so, steps S4–S6 are performed. Step S4 shifts the samples in the frame. Step S5 D/A converts the shifted samples of the frame. Step S6 attenuates the section of the analog signal that corresponds to the frame. If the maximum magnitude does not fall below the threshold, the frame is D/A converted with unaltered samples. In both cases the procedure then returns to step S1 to process the next frame.

The embodiment of FIG. 8 only involved a single threshold. However, it is also possible to have several thresholds associated with corresponding shifts/attenuations.

Figure 9:
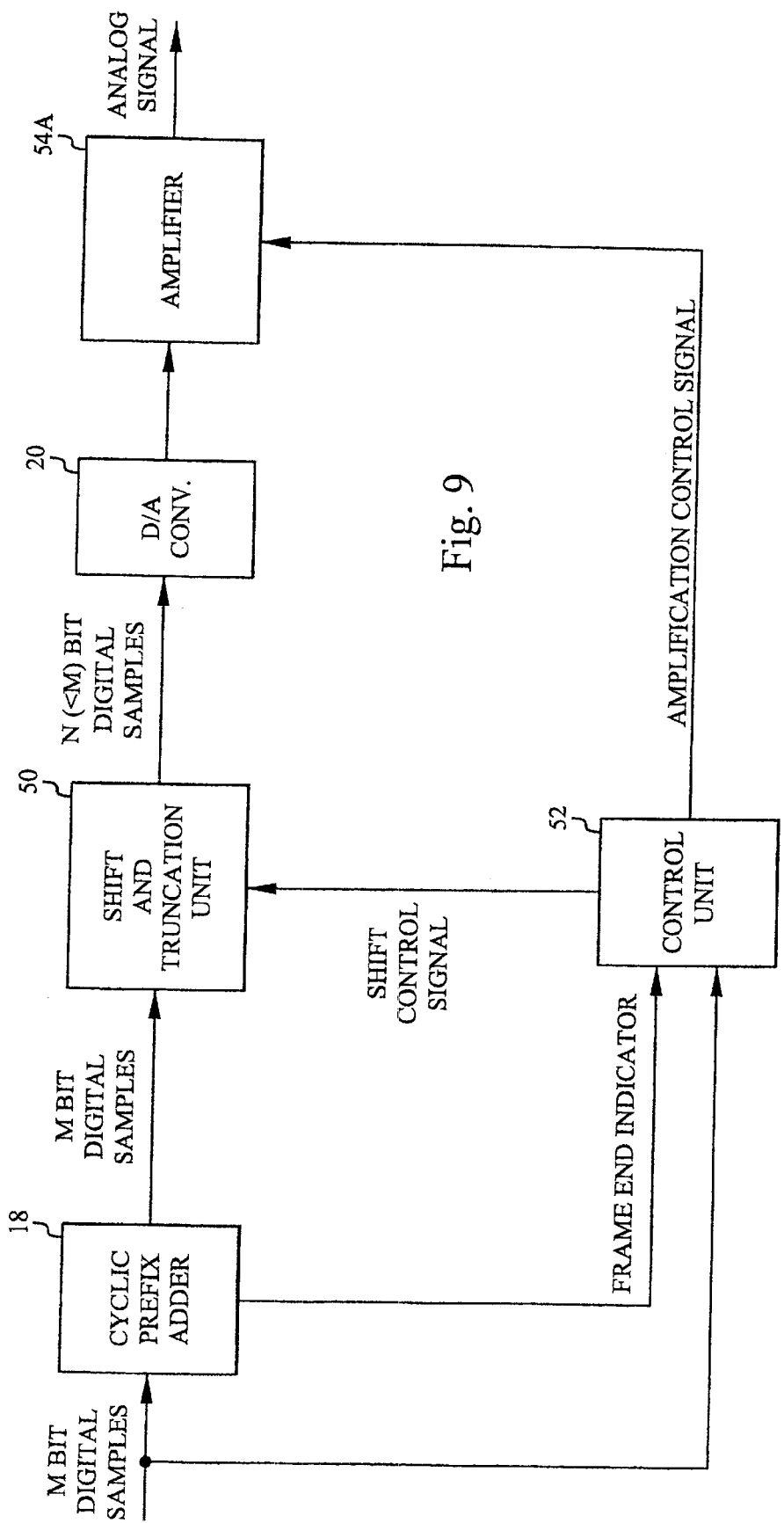
FIG. 9 is a block diagram of another exemplary embodiment of the D/A converter in accordance with the present invention.

FIG. 9 is a block diagram of another exemplary embodiment of the D/A converter in accordance with the present invention. This embodiment is based on the observation that it is also possible to forward only the least significant bits to the D/A converter and to detect overflow in a frame instead. If overflow occurs, the samples of the frame are shifted to decrease the magnitude, and a compensating amplification is then performed after D/A conversion. Thus, this embodiment differs from the embodiment of FIG. 7 in that control unit 52 detects overflow and in that attenuator 54 is replaced by an amplifier 54A. If the system already includes an amplifier, as indicated in FIG. 1, this amplifier may be controlled directly instead of providing a separate amplifier 54A.

Figure 10:
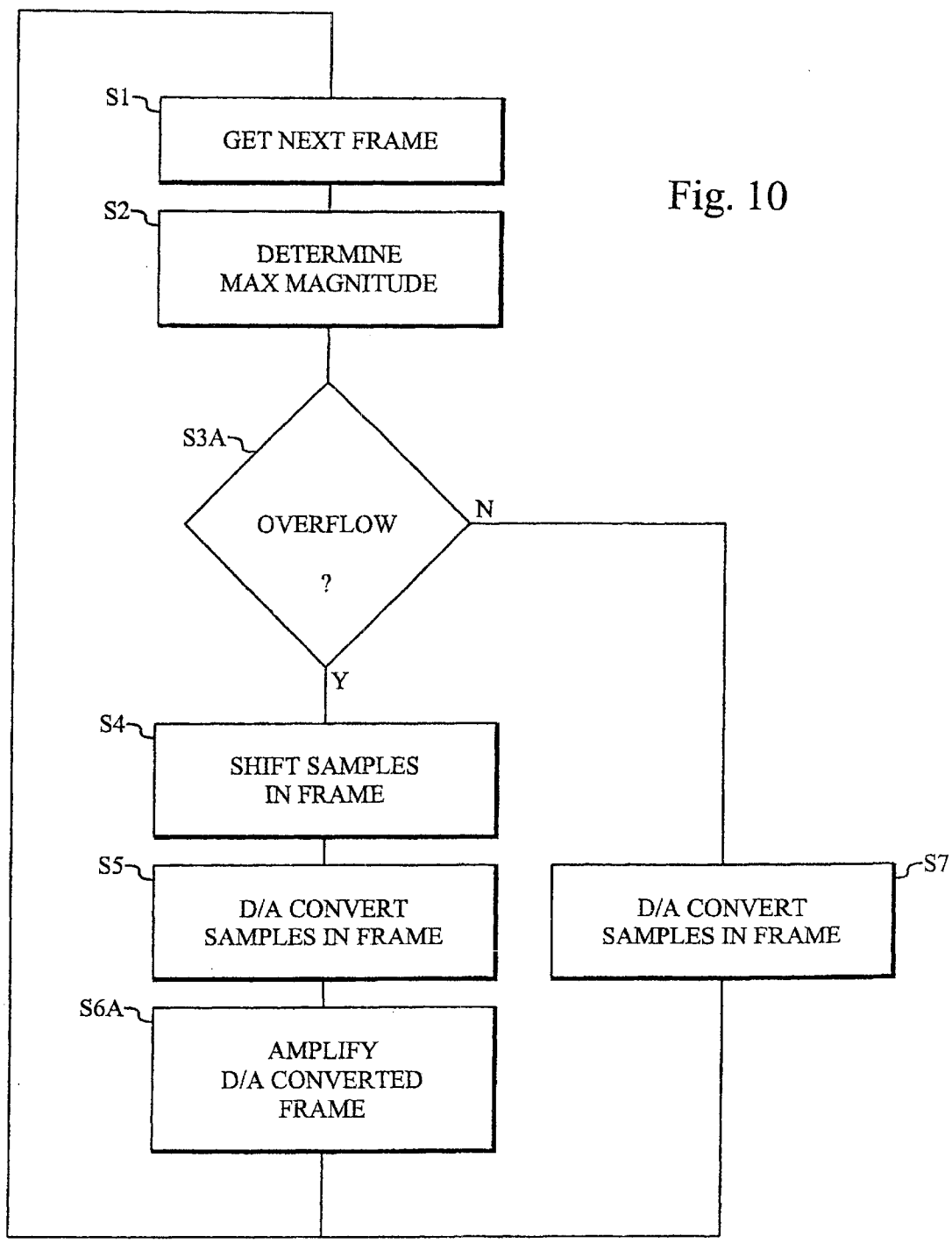
FIG. 10 is a flow chart of another exemplary embodiment of the D/A conversion method in accordance with the present invention.

FIG. 10 is a flow chart of another exemplary embodiment of the D/A conversion method in accordance with the present invention. This embodiment may be implemented by the D/A converter in FIG. 9. The embodiment differs from the embodiment of FIG. 8 in that step S3 is replaced by a step S3A that detects overflow. Furthermore step S6 is replaced by a compensating amplification step S6A.

Figure 11:
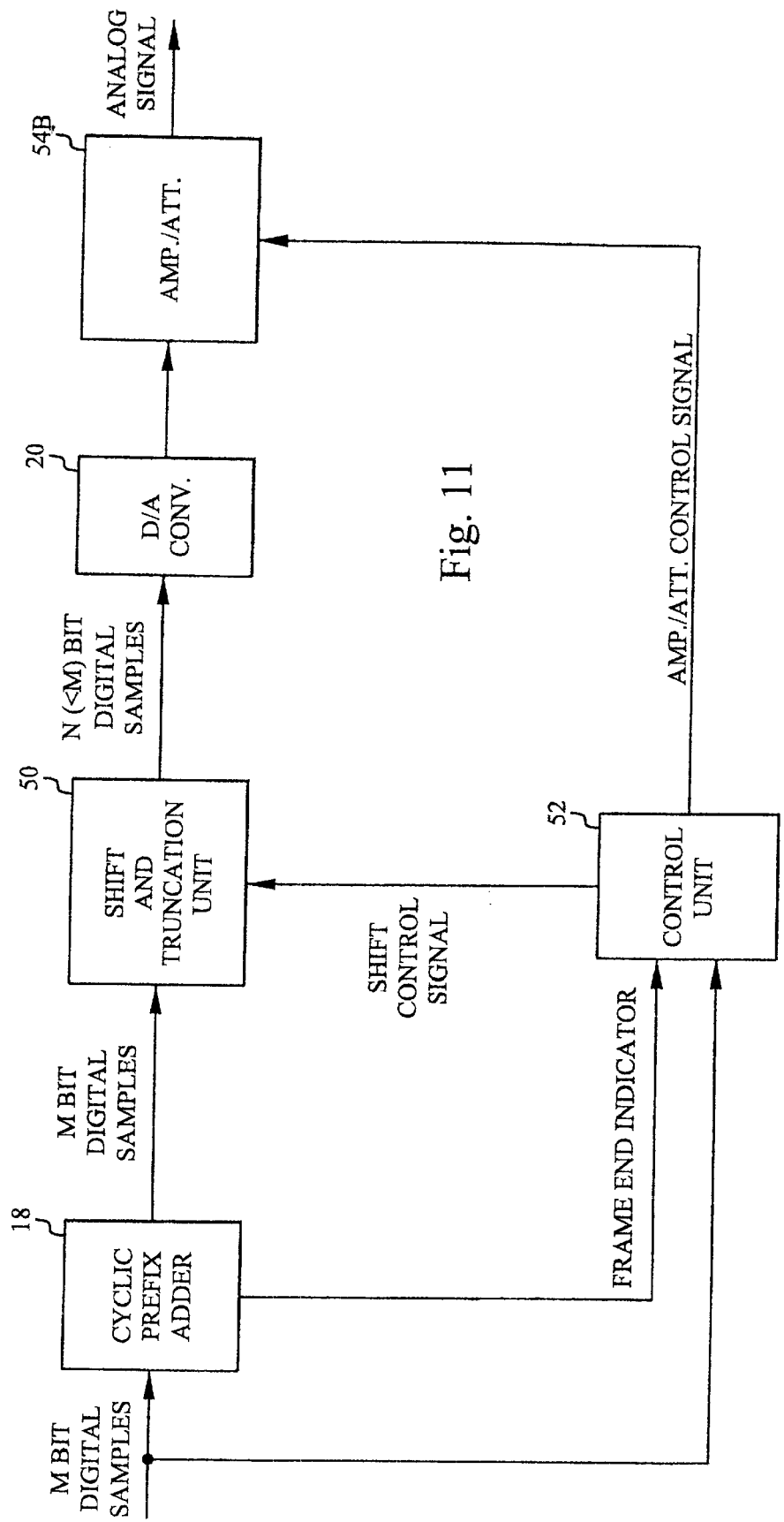
FIG. 11 is a block diagram of still another exemplary embodiment of the D/A converter in accordance with the present invention.

FIG. 11 is a block diagram of still another exemplary embodiment of the D/A converter in accordance with the present invention. This embodiment is a combination of the embodiments of FIGS. 7 and 9. If a frame is weak the samples are shifted/attenuated, if it overflows they are shifted in the opposite direction and amplified. If the samples of the frame fall within a "window" between these extreme cases, the frame is D/A converted without modification. In this embodiment control unit 52 tests whether the samples of a frame exceed the borders of the window, and if so, in which direction a shift should be performed and whether an amplification or attenuation should be performed. Furthermore, attenuator 54 of FIG. 7 is replaced by an amplifier/attenuator block 54B. If the system includes an amplifier, as indicated in FIG. 1, a suitable embodiment is to integrate amplifier/attenuator 54B in this amplifier and.

As an example illustrating this embodiment, consider samples with a magnitude resolution of 14 bits and a D/A converter with a resolution of 12 bits. From the viewpoint of the D/A converter, the most significant bit is assumed to be an "overflow bit", as in the embodiment of FIG. 9, and the second most significant bit is used for detection of weak frames, as in the embodiment of FIG. 7. Thus, if both bits are 0 for all the samples of the frame, the frame should be shifted to increase its magnitude and thereafter attenuated. On the other hand, if the frame contains one or more samples with the most significant bit set to 1, this is interpreted as an overflow. In this case the frame is shifted in the opposite direction and thereafter amplified. If none of the samples in the frame has its most significant bit set to 1 and at least 1 sample has its second most significant bit set to 1, the frame is within the allowed "window" and is not modified.

Figure 12:
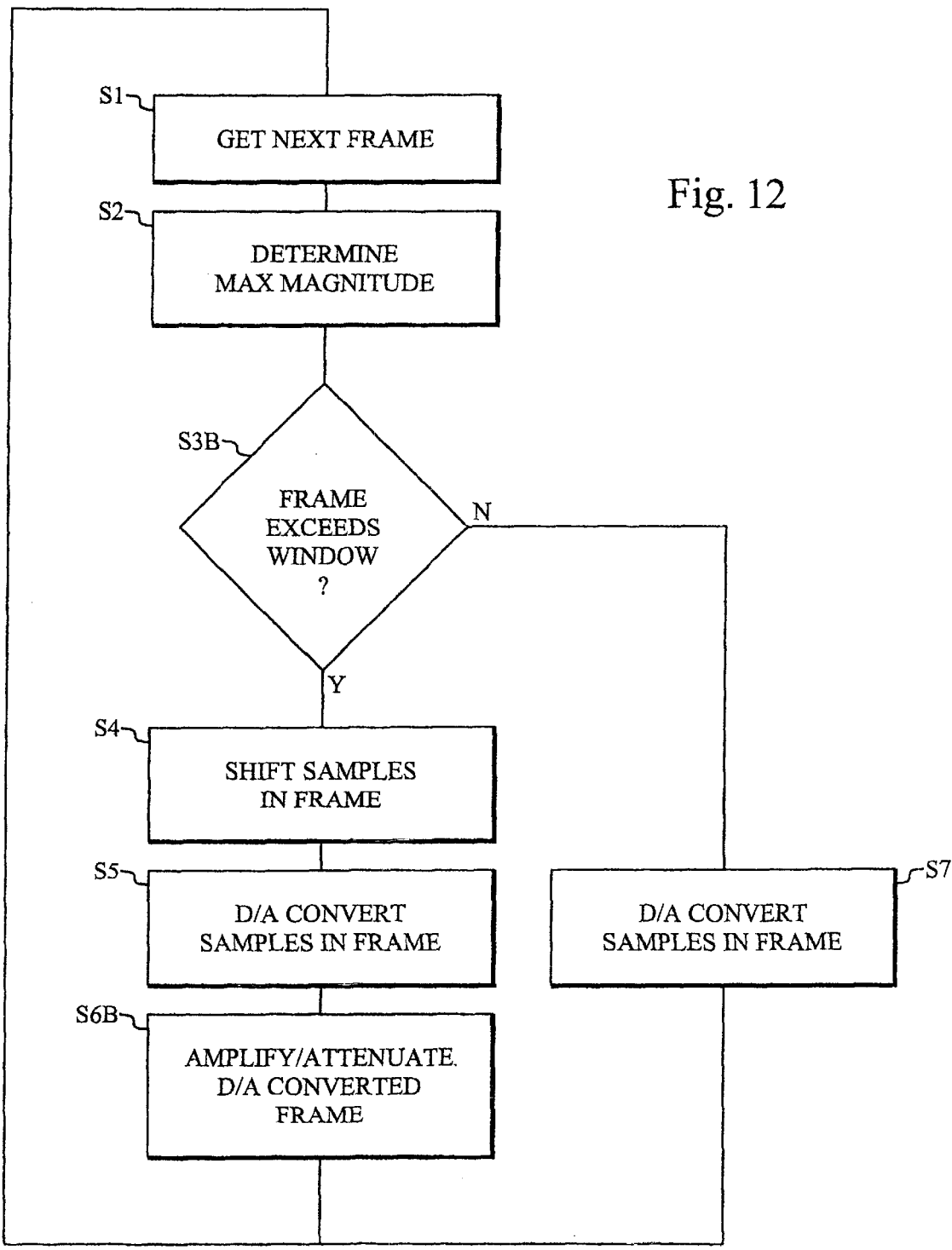
FIG. 12 is a flow chart of still another exemplary embodiment of the D/A conversion method in accordance with the present invention.

FIG. 12 is a flow chart of still another exemplary embodiment of the D/A conversion method in accordance with the present invention. This embodiment may be implemented by the D/A converter in FIG. 11. The embodiment differs from the embodiment of FIG. 8 in that step S3 is replaced by a step S3B that detects whether the samples of a frame fall within a window or not. Furthermore step S6 is replaced by a compensating amplification/attenuation step S6B.

Although the present invention has been explained with reference to an ADSL system, it is appreciated that it is applicable to any system based on sample frames and guard times between frames.

It will be understood by those skilled in the art that various modifications and changes may be made to the present invention without departure from the scope thereof, which is defined by the appended claims.

What is claimed is:

1. A D/A conversion method, including the steps of:
   arranging a stream of digital samples into frames, each frame including a guard time period;
   determining a measure of the overall magnitude of digital samples in each frame;
   increasing the magnitude of all samples of frames that have a measure that falls below a predetermined threshold by shifting the samples a common number of bits;
   D/A converting frames with shifted and frames with unshifted samples; and
   attenuating the D/A converted samples of frames with shifted samples to compensate for the magnitude increase.

2. A D/A conversion method, including the steps of:
   arranging a stream of digital samples into frames, each frame including a guard time period;
   determining a measure of the overall magnitude of digital samples in each frame;
   decreasing the magnitude of all samples of frames that have a measure that exceeds a predetermined threshold by shifting the samples a common number of bits;
   D/A converting frames with shifted and frames with unshifted samples; and
   amplifying the D/A converted samples of frames with shifted samples to compensate for the magnitude decrease.

3. The method of claim 1, wherein said measure comprises the maximum magnitude of the samples in each frame.

4. The method of claim 1, wherein said guard time period comprises a cyclic prefix.

5. A D/A conversion apparatus, including:
   means for arranging a stream of digital samples into frames, each frame including a guard time period;
   means for determining a measure of the overall magnitude of digital samples in each frame;
   means for increasing the magnitude of all samples of frames that have a measure that falls below a predetermined threshold by shifting the samples a common number of bits;
   a D/A converter for converting frames with shifted and frames with unshifted samples; and
   means for attenuating the D/A converted samples of frames with shifted samples to compensate for the magnitude increase.

6. A D/A conversion apparatus, including:
   means for arranging a stream of digital samples into frames, each frame including a guard time period;

means for determining a measure of the overall magnitude of digital samples in each frame;

means for decreasing the magnitude of all samples of frames that have a measure that exceeds a predetermined threshold by shifting the samples a common number of bits;

a D/A converter for converting frames with shifted and frames with unshifted samples; and means for amplifying the D/A converted samples of frames with shifted samples to compensate for the magnitude decrease.

7. The apparatus of claim 5, wherein said arranging means includes a cyclic prefix adding means.

8. A digital subscriber line system, including:

means for arranging a stream of digital samples into frames, each frame including a cyclic prefix;

means for determining a measure of the overall magnitude of digital samples in each frame;

means for increasing the magnitude of all samples of frames that have a measure that falls below a predetermined threshold by shifting the samples a common number of bits;

a D/A converter for converting frames with shifted and frames with unshifted samples; and means for attenuating the D/A converted samples of frames with shifted samples to compensate for the magnitude increase.

9. A digital subscriber line system, including:

means for arranging a stream of digital samples into frames, each frame including a cyclic prefix;

means for determining a measure of the overall magnitude of digital samples in each frame;

means for decreasing the magnitude of all samples of frames that have a measure that exceeds a predetermined threshold by shifting the samples a common number of bits;

a D/A converter for converting frames with shifted and frames with unshifted samples; and means for amplifying the D/A converted samples of frames with shifted samples to compensate for the magnitude decrease.

10. The system of claim 8, wherein said system is an ADSL system.

11. The system of claim 8, wherein said system is a VDSL system.

* * * * *